United States Patent [19]

Herb

[11] 4,312,615
[45] Jan. 26, 1982

[54] FASTENING UNIT INCLUDING AN ANCHORING MEMBER AND A SPREADER WEDGE

[75] Inventor: Armin Herb, Peissenberg, Fed. Rep. of Germany

[73] Assignee: Hilti Aktiengesellschaft, Schaan, Liechtenstein

[21] Appl. No.: 153,862

[22] Filed: May 28, 1980

[30] Foreign Application Priority Data

Jun. 1, 1979 [DE] Fed. Rep. of Germany ....... 2922567

[51] Int. Cl.³ ............................................. F16B 13/04
[52] U.S. Cl. ..................................................... 411/78
[58] Field of Search ................... 411/78, 79, 75, 80, 411/24, 27, 15, 449, 448, 447, 469, 477–479, 446, 461, 462, 470

[56] References Cited

U.S. PATENT DOCUMENTS

| | | | |
|---|---|---|---|
| 414,092 | 10/1889 | Thurmond et al. | 411/76 |
| 1,695,113 | 12/1928 | Langton et al. | 411/78 |
| 2,748,594 | 6/1956 | Edwards | 411/76 |
| 3,680,430 | 8/1972 | Cannon et al. | 411/76 |
| 3,799,027 | 3/1974 | Galloway | 411/78 |

*Primary Examiner*—Ramon S. Britts
*Attorney, Agent, or Firm*—Toren, McGeady and Stanger

[57] ABSTRACT

A fastening unit for use in a prepared borehole includes an anchoring member and a spreader wedge. The anchoring member is formed from a single piece of metal plate and consists of an axially elongated shank part and a flange at one end of the shank part. The flange extends perpendicularly of the shank part and is bent relative to the shank part so that an arched surface is located between the two parts of the anchoring member. The flange defines an opening through which the wedge extends. The surfaces within the opening of the flange and certain axially extending surfaces of the shank part guide the wedge as it slides axially relative to the anchoring member when the fastening unit is being anchored in a borehole. The wedge guiding surfaces on the anchoring member extend into the axially extending range of the wedge guiding surfaces of the flange.

11 Claims, 4 Drawing Figures

FASTENING UNIT INCLUDING AN ANCHORING MEMBER AND A SPREADER WEDGE

SUMMARY OF THE INVENTION

The present invention is directed to a fastening unit made up of an anchoring member and a spreader wedge. The spreader wedge is slidable relative to the anchoring member. At one end the anchoring member has an outwardly bent flange which defines an opening through which the spreader wedge extends into contact with the anchoring member. Surfaces on the wedge forming the opening and surfaces on the anchoring member extending parallel to its axis form guiding surfaces for the spreader wedge.

Fastening units, such as described above, are especially useful in the suspension of hung ceilings, and for supporting panelling, scaffolds, pipes, wire and the like. These fastening units are used in very large quantities. Accordingly, it is important to be able to manufacture such units economically and to be able to set them in place using the least amount of time and no special tools. For safety reasons, it is also required that such fastening units display a certain after-spreading behavior under stress.

Known fastening units of this type are usually constructed in accordance with the wedge spreading principle. One part of the element is formed as an anchor bolt for securing the load to be suspended or supported. In these known units, a spreader member, usually wedge-shaped, is moved along a wedge surface on the anchor bolt. When these known fastening units are used, a certain spreading action can be afforded which is sufficient to carry at least the weight of the object to be suspended or supported. If any further stress is placed on the anchor bolt, an additional spreading action is developed.

In these known elements, which have proven to be particularly satisfactory, the anchor bolt has a wedge surface which in the driving-in direction of the unit approaches the full circumferential shape of the bolt. The trailing end of the anchor bolt, located outside of the borehole, has a flange with an opening through which the spreader wedge can be inserted. The surfaces of the opening through the flange guide the spreader wedge during placement of the fastening unit and also facilitate the assembly of the anchor bolt and the spreader wedge as a unit. For the purpose of assembly, the surfaces of the flange provide a clip-like action so that the spreader wedge is locked to the anchor bolt.

When the anchor bolt and spreader wedge are being assembled as a unit as well as during placement of the fastening unit, it is important that the two parts are disposed in closely fitted contact so that, in combination, they provide a basically circular cross-section corresponding to the cross-section of the borehole. In this way the tolerances of the borehole can be kept very small and optimum anchoring values of the fastening unit can be attained. If the parts of the fastening unit do not fit in close contact with one another there is the problem that the fastening unit cannot be inserted correctly into the borehole and further, it is possible that the borehole may be damaged or deformed causing the anchoring values to drop considerably. The opening provided in the flange of the anchor bolt which serves to guide the spreader wedge is most significant for the necessary closely fitted contact between the bolt and the wedge. Therefore, it is necessary to maintain exacting requirements during the production of the anchor bolt, especially in the formation of the guiding surfaces in the flange. Such requirements have the disadvantage that the fastening unit cannot be manufactured economically and this problem is particularly significant since such units should be mass produced.

Therefore, it is the primary object of the present invention to provide a fastening unit of the type mentioned above which meets all of the requirements for placement and anchoring of the unit and, in addition, permits economical production.

In accordance with the present invention, the anchoring member consists of a shank part and a flange extending transversely outwardly from one end of the shank part. The surface of the shank part which guides the spreader wedge extends in the axial direction of the anchoring member and through the opening in the flange for at least the axial dimension of the flange.

An important feature of the invention is the formation of the anchoring member as a bent or shaped stamped section. By forming the anchoring member in this manner an extremely economical production is afforded in which operation the flange is bent outwardly from one end of the shank part of the anchoring member. Since sharp edges never develop in such bent surfaces, an arched surface is provided between the flange and the guiding surfaces of the shank part when the anchoring member is being formed. Since the guiding surfaces of the opening in the flange are located in the same axial range as this arched surface, it could be possible that the spreader wedge would separate from the guiding surface of the anchoring member due to contact with the arched surface. This possible disadvantage is prevented in accordance with the invention by forming the flange and the shank part so that the guiding surfaces on the shank part extend through the axial extent of the guiding surfaces within the opening of the flange. Therefore, for the extent of the guiding surfaces in the opening of the flange extending in the axial direction, the surface of the shank part of the anchoring member maintains the continued surface contact with the spreader wedge so that the wedge and the guide surfaces remain in parallel relation. Accordingly, with the opening in the flange affording a clip-like securement of the spreader wedge to the anchoring member, the guiding surfaces in the opening of the flange press the spreader wedge into parallel contact with the surfaces on the shank part of the anchoring member thereby preventing the wedge from being displaced from surface contact with the shank part.

The parallel guidance of the spreader wedge can be provided, in accordance with the present invention, so that the arched surface of the anchoring member formed when the flange is bent outwardly from the shank part, is located in the axially extending region of the guiding surfaces within the opening through the flange. Therefore, it is possible to bend the flange outwardly from the shank part forming the intermediate arched surface. A projection can be stamped into the arched surface so that the projection is located at the axial region of the opening through the flange. The projection extends toward the guiding surfaces in the flange opening and affords a stop surface in parallel relation with the guiding surfaces on the shank part with the stop being located opposite and extending for the same axial range as the guiding surfaces of the flange opening.

In another embodiment of the invention, the arched surface formed between the shank part in the flange can be located outwardly from the guiding surfaces in the flange opening, that is, the arched surface projects outwardly in the direction opposite to the driving-in direction of the fastening unit. In such an arrangement, the guiding surfaces on the shank part of the anchoring member extend into the opening through the flange for affording the desired guidance of the spreader wedge. In this arrangement, the arched surface is located outwardly from the trailing side of the flange.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 3:
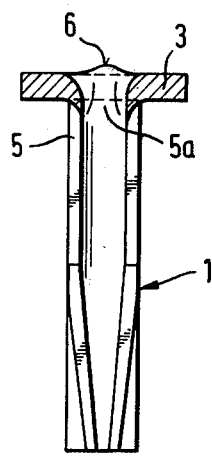
FIG. 3 is a sectional view taken along the line III—III of FIG. 2.
Figure 1:
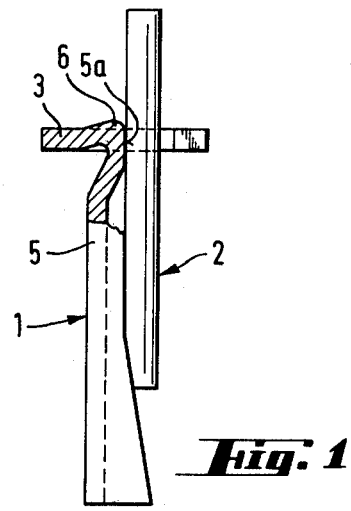
FIG. 1 is a side view, partly in section, of a complete fastening unit including a projection in accordance with the present invention.
Figure 2:
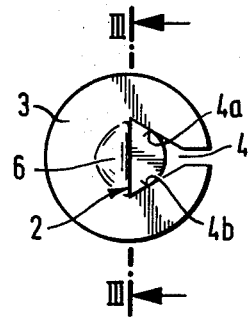
FIG. 2 is a top view of the fastening unit shown in FIG. 1.

One embodiment of a fastening unit incorporating the present invention is illustrated in FIGS. 1, 2 and 3. The fastening unit, as shown in FIGS. 1 and 2, is made up of an axially elongated anchoring member 1 and an axially elongated spreader wedge 2. As viewed in FIG. 1 the upper end of the anchoring member 1 and the spreader wedge 2 is the first end or trailing end with the lower end being the second end or leading end which is inserted first into the borehole, not shown. The anchoring member 1 is formed from a section of metal plate and consists of a flange 3 bent outwardly from an axially extending shank part 5. The flange 3 extends approximately perpendicularly of the axis of the shank part. Flange 3 extends around the first end of the shank part 5 and forms an opening 4 having a pair of guiding wall surfaces 4a, 4b. As can be seen in FIG. 2, the flange 3 is not continuous around the first end of the shank part, rather it has a radially extending slot extending outwardly from the opening 4 which provides the flange with a clip-like action.

The shank part 5 is bent or rounded so that it forms a portion of a tubular member. Extending from the first end of the shank part, an axially extending first portion part is half round having a rounded convex outer surface and a rounded concave inner surface. From the lower end of the first portion to the second end of the shank part, the transverse section of the shank part increases from the half round section to almost a completely rounded section at the second end or leading end. Accordingly, for the axial length of the first portion of the shank part a pair of edges are provided at the opposite ends of the half round section with the edges being parallel to one another and to the axis of the anchoring member 1. The surfaces of these opposite edges are located in the same plane. Below the lower end of the first portion of shank part 5 the opposite edges of the transverse section gradually converge toward one another to the lower or second end of the shank part so that a wedge surface is formed by these opposite edges.

When the plate section is shaped to form the anchoring member 1, and the flange 3 is bent outwardly from the shank part 5, an arched surface results. During the formation of the anchoring member 1, adjacent the arched surface, at the first end of the shank part, a surface 5a is provided in the axial extent of the opening 4 through the flange with the surface 5a located in the plane of the opposite edges of the first portion of the shank part 5 extending from the first end. In addition, as part of the forming operation, a projection 6 extends upwardly from the upper surface of the flange 3 projecting outwardly from the first end of the shank part 5, that is, in the opposite direction from the leading end of the fastening unit when it is placed into a borehole.

Due to the shaped configuration of the surface 5a of the shank part 5 and the projection 6, note FIG. 2, within the axial range of the flange opening 4, surface 5a in combination with surfaces 4a and 4b on the flange form guiding surfaces for the spreader wedge 2. Furthermore, within the opening 4 the surface 5a forms a continuation of the guiding surfaces for the spreader wedge provided by the opposite edges of the first portion of the shank part. Because of this arrangement of the guiding surfaces, the spreader wedge 2 is maintained in contact with the guiding surfaces and is not displaced from them during the spreading action. The formation of the flange 3 clips the spreader wedge 2 to the anchoring member 1 so that, as assembled, the fastening unit can be inserted into a borehole without fear that the two parts of the unit might separate.

As can be seen in FIG. 1, the surface 5a formed by the arched surface of the plate section, when the flange 3 is bent outwardly from the shank part 5, extends for an axial length greater than the axial length of the opening 4 through the flange. Because of this shaped arrangement of the anchoring member 1, continuous effective guidance of the spreader wedge 2 is assured.

Figure 4:
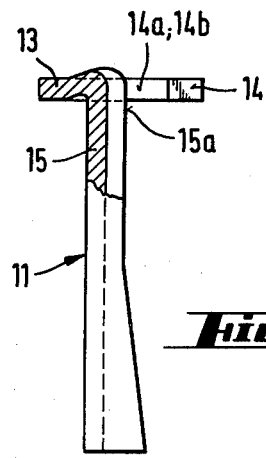
FIG. 4 is a side view, partly in section, of the anchoring member of another embodiment of the fastening unit in accordance with the present invention.

In FIG. 4 an anchoring member 11 of another fastening unit embodying the present invention is illustrated, however, the shaped construction of the anchoring member in the range of the opening 14 through the flange 13 is different from that in the embodiment of FIGS. 1–3. Anchoring member 11 includes flange 13 bent outwardly from the first end of the shank part 15. Shank part 15 is formed in the same general manner as shown in FIG. 1. The flange 13 has an opening 14 providing guiding surfaces 14a, 14b for a spreader wedge, not shown. Flange 13 is discontinuous in the same manner as flange 3 providing a slot extending into the opening 14 so that the flange can provide a clip-like action holding the spreader wedge against the anchoring member 11.

In forming flange 13 on the first end of the shank part 15, the arched surface of the plate section forming the anchoring element is located upwardly from the plane of the flange 14 so that there is no inward projection of the shank part in the axial region of the opening through the flange. Instead, the opposite edges 15a of the shank part 15 which provide the guiding surfaces on the shank part for the spreader wedge, extend upwardly through the axial dimension of the flange opening 14. Accordingly, within the opening 14 through the flange the spreader wedge is guided by the surfaces 14a, 14b on the flange and by the edges 15a of the shank part. Below the flange the spreader wedge is guided by the opposite edges 15a on the first portion of the shank part so that it is assumed that axially parallel guidance of the spreader wedge is afforded.

It will be appreciated that other constructions of the anchoring member and spreader wedge could be provided within the principles of the present invention.

While the plate section forming the anchoring member is shown as metal it would be possible to use other suitable materials.

While specific embodiments of the invention have been shown and described in detail to illustrate the application of the inventive principles, it will be understood that the invention may be embodied otherwise without departing from such principles.

What is claimed is:

1. Fastening unit comprising an axially elongated anchoring member and an axially elongated spreader wedge, each of said anchoring member and spreader wedge having a first end and a second end spaced apart in the axial direction thereof, said spreader wedge being slidably displaceable in contact with said anchoring member, said anchoring member comprising an axially elongated shank part extending between the first and second ends thereof and a flange secured to and extending transversely outwardly from the first end of said shank part, said flange having an opening therethrough, said spreader wedge being positionable through the opening in said flange, the opening in said flange having surfaces for guiding said spreader wedge, said shank part having at least one axially extending surface aligned with the opening in said flange for combining with the surfaces in the opening of said flange for guiding said spreader wedge as it is displaced in the axial direction thereof through said flange opening, wherein the improvement comprises that said axially extending surface of said shank part guiding said wedge outside the axially extending region of said flange is aligned with at least part of the axially extending surfaces of said opening in the axially extending region of said flange and extends from said flange toward the second end of said anchoring member, said flange is formed integrally with and is bent outwardly from said shank part into a plane extending transversely of the axis of said shank part, a portion of said flange is arched relative to the transversely extending plane and projects from the transversely extending plane in the opposite direction from the second end of said anchoring member.

2. Fastening unit, as set forth in claim 1, wherein said anchoring member is formed from a section of a metal plate having a first portion and a second portion with said first and second portions being integral, said first portion being shaped as said axially elongated shank part and said second portion being bent outwardly from the first end of said shank part for forming said flange with the part of said plate interconnecting said shank part and said flange forming said arched portion.

3. Fastening unit, as set forth in claim 1, wherein said arched portion of said flange includes a part of said shank deformed into the plane of said guiding surface on said shank located outside the axially extending region of said flange.

4. Fastening unit, as set forth in claim 1, wherein said axially extending surface of said shank part outside the axially extending region of said flange extends into the axially extending region of said flange and forms a part of said surfaces within the opening in said flange for guiding said spreader wedge.

5. Fastening unit, as set forth in claim 4, wherein the opening in said flange forms additional guide surfaces spaced circumferentially from said guide surface which extends from the axially extending surfaces of said shank part located outside the axially extending region of said flange.

6. Fastening unit comprising an axially elongated anchoring member and an axially elongated spreader wedge, each of said anchoring member and spreader wedge having a first end and a second end spaced apart in the axial direction thereof, said spreader wedge being slidably displaceable in contact with said anchoring member for movement in the direction toward the second end of said anchoring member, said anchoring member comprising an axially elongated shank part extending between the first and second ends thereof and a flange secured to and extending transversely outwardly from the first end of said shank part, said flange forming an opening therethrough, said spreader wedge being positionable through the opening in said flange, the opening in said flange having surfaces therein for guiding said spreader wedge, said shank part having at least one axially extending surface aligned with the opening in said flange for combining with the surfaces in the opening of said flange for guiding said spreader wedge as it is displaced in the axial direction thereof through said flange opening, wherein the improvement comprises that said shank part is rounded in the direction transverse to the axial direction thereof forming a rounded convex surface and a rounded concave surface, a first portion of said shank part extending from the first end thereof being approximately half round, a second portion of said shank part extending from the end of said first portion remote from the first end of said anchoring member and varying from an approximately half round at the end of said first portion and approaching a full round section at the second end of said anchoring member with the opposite ends of the section of said second portion extending transversely of the axis of said anchoring member at the second end thereof being in spaced relation, the opposite ends of the transverse section of said first portion being planar and located in a plane parallel to the axis of said anchoring member and the opposite ends of the transverse section of said second portion converging toward one another in the direction from the first portion toward the second end of said anchoring member, said spreader wedge from the first end thereof being approximately half round for a first portion thereof and a second portion thereof extending from the end of said first portion of said spreader wedge to the second end of said spreader wedge having a decreasing cross-sectional area from said first portion of said spreader wedge to said second end of said spreader wedge, said first portion of said wedge comprising an axially extending planar surface and an axially extending convex surface extending between the opposite ends of said planar surface and said second portion of said wedge having an axially extending planar surface extending obliquely to said planar surface of said first portion of said wedge and an axially extending convex surface extending between the opposite ends of said planar surface thereof, so that in the assembled condition of said fastening unit placed in a prepared borehole and ready to be expanded into anchoring engagement with the borehole, said spreader wedge being held within the opening in said flange and said planar surface of said first portion of said spreader wedge being in bearing contact with the opposite ends of said first portion of said shank part and said planar surface of said second portion of said wedge being in bearing contact against the opposite ends of said second portion of said shank part with the first portions of said shank part and wedge forming a full round section approximately the section of the prepared borehole whereby when said spreader wedge is displaced in the axial direction relative to said anchoring member said wedge moves in the direction toward the second end of said anchoring member and said planar surface of said first part of said wedge starts to slide along the opposed ends of said second portion of said shank part for effecting a wedging action within the borehole.

7. Fastening unit, as set forth in claim 6, wherein said anchoring member having an arched surface interconnecting said flange and the first end of said shank part with said arched surface having a surface co-extensive with the guiding surfaces within the opening of said flange and said co-extensive surface on the arched surface being in the same plane with the opposite ends of said first portion of said shank part so that the combination of the co-extensive surface of said arched surface and the guiding surfaces in the opening of said flange cooperate with the opposite ends of said first section of said shank part for guiding said spreader wedge in axial parallel relation with said anchoring member.

8. Fastening unit, as set forth in claim 6, wherein said anchoring member having an arched surface interconnecting said flange and said first end of said shank part, said arched surface located axially outwardly from said flange in the direction away from the second end of said anchoring member, said opposite ends of said first portion of said shank part being co-extensive within the opening in said flange with the guiding surfaces in the opening of said flange.

9. Fastening unit as set forth in claim 7, wherein the surface of said arched surface within the opening of said flange and co-extensive with the guiding surfaces of said flange being in the same plane with the surface of the opposite ends of said first portion of said shank part.

10. Fastening unit, as set forth in claim 8, wherein said arched portion of said anchoring member forms a projection extending outwardly from said flange in the direction away from the second end of said anchoring member.

11. Fastening unit, as set forth in claim 6, wherein said flange encircles the first end of said shank part, and said flange having a slot extending therethrough in the direction transverse to the axial direction from the opening through said flange to the outer surface of said flange with said slot being located on the opposite side of the opening from the surface on said shank part forming a guiding surface for said wedge and said slot in said flange affording a clip-like action by said flange for holding said spreader wedge.

* * * * *